(12) United States Patent
Funato et al.

(10) Patent No.: US 7,514,131 B2
(45) Date of Patent: Apr. 7, 2009

(54) IN-MOLD LABEL WITH SEPARABLE PART

(75) Inventors: Takashi Funato, Tokyo (JP); Takatoshi Nishizawa, Ibaraki (JP); Masaki Shiina, Ibaraki (JP)

(73) Assignee: Yupo Corporation, Tokyo (JP)

( * ) Notice: Subject to any disclaimer, the term of this patent is extended or adjusted under 35 U.S.C. 154(b) by 647 days.

(21) Appl. No.: 11/057,252

(22) Filed: Feb. 15, 2005

(65) Prior Publication Data

US 2005/0191449 A1 Sep. 1, 2005

Related U.S. Application Data

(63) Continuation of application No. PCT/JP03/14902, filed on Nov. 21, 2003.

(30) Foreign Application Priority Data

Nov. 22, 2002 (JP) ............... 2002-339325
Feb. 14, 2003 (JP) ............... 2003-036083

(51) Int. Cl.
  B32B 27/08 (2006.01)
  B32B 3/10 (2006.01)
  B32B 7/12 (2006.01)
  B32B 9/04 (2006.01)
  B32B 27/00 (2006.01)
  B32B 27/32 (2006.01)
  B32B 27/34 (2006.01)

(52) U.S. Cl. ............... 428/35.7; 428/34.1; 428/35.2; 428/36.91; 428/131; 428/136; 428/137; 428/343; 428/347; 428/349; 428/354; 428/411.1; 428/474.4; 428/475.5; 428/475.8; 428/500; 428/515; 428/523

(58) Field of Classification Search ............... 438/34.1, 438/34.2, 35.2, 35.7, 36.9, 36.91, 131, 134, 438/136–138, 343, 346, 347, 349, 352, 354, 438/411.1, 474.4, 475.5, 475.8, 500, 515, 438/516, 523

See application file for complete search history.

(56) References Cited

U.S. PATENT DOCUMENTS 5,172,936 A    12/1992  Sullivan et al.
5,409,754 A *  4/1995  Yasuda et al. ............... 428/43

(Continued)

FOREIGN PATENT DOCUMENTS

EP        0 254 923        2/1988

(Continued)

Primary Examiner—Rena L Dye
Assistant Examiner—Walter B Aughenbaugh
(74) Attorney, Agent, or Firm—Oblon, Spivak, McClelland, Maier & Neustadt, P.C.

(57) ABSTRACT

An in-mold label includes a thermoplastic resin film substrate layer and a heat-seal resin layer. The label has a label body and a separable part. Tearable perforations are provided between the label body and the separable part. The adhesion strength between the separable part and a thermoplastic resin container is from 80 to 270 gf/10 mm, when the label is stuck to the container during in-mold production of the container. A lubricant is applied to from 55 to 80% of the surface area of the heat-seal resin layer of the separable part. The wettability index of both the thermoplastic resin film substrate layer surface and the heat-seal resin layer surface is from 34 to 73 mN/m.

18 Claims, 2 Drawing Sheets

U.S. PATENT DOCUMENTS

| | | | |
|---|---|---|---|
| 5,492,757 A | * | 2/1996 | Schuhmann et al. ........ 428/329 |
| 2001/0003626 A1 | | 6/2001 | Syoda et al. |
| 2002/0050319 A1 | | 5/2002 | Nishizawa et al. |

FOREIGN PATENT DOCUMENTS

| | | |
|---|---|---|
| JP | 58-69015 | 4/1983 |
| JP | 6-51701 | 2/1994 |
| JP | 6-95593 | 4/1994 |
| JP | 06-308886 | 11/1994 |
| JP | 09-230791 | 9/1997 |
| JP | 10-315410 | 12/1998 |
| JP | 2000-25068 | 1/2000 |
| JP | 2001-202020 | 7/2001 |
| JP | 2002-316394 | 10/2002 |

* cited by examiner (1)

(2)

(3)

(4)

IN-MOLD LABEL WITH SEPARABLE PART

The present application is a continuation of PCT/JP03/14902 filed on Nov. 21, 2003 and claims priority under 35 U.S.C. §119 of Japanese Patent Application No. 339325/2002 filed on Nov. 22, 2002 and Japanese Patent Application No. 36083/2003 filed on Feb. 14, 2003.

BACKGROUND OF THE INVENTION

1. Field of the Invention

The present invention relates to an in-mold label with a separable part, which is stuck to a thermoplastic resin container produced in a mode of differential pressure molding or blow molding, simultaneously with the production of the container.

2. Description of the Related Art

Known are some in-mold labels that are used in an in-mold process in which a label is previously set in a mold and then a thermoplastic resin is introduced into the mold and molded into a container in a mode of injection molding, blow molding, differential pressure molding or foam molding while, at the same time, the label is stuck to the container produced (see JP-A 58-69015, and EP-A 254,923).

As one example of such labels, proposed is an in-mold label with a separable coupon ticket or the like (see JP-A 6-51701, 6-95593, 6-308886). Some methods have been proposed for designing such a label with a separable part in order that the purchaser who has bought a labeled product can readily tear off the separable part from the label. For example, the separable part is partitioned from the label body by perforations along which the part is to be torn off, and further the amount of the adhesive on the back side of the separable part is reduced (see U.S. Pat. No. 5,172,936), or no adhesive is applied to the separable part.

However, the label with such a separable part has a drawback in that the separable part is readily loosened from the surface of the labeled container. For example, when resin containers labeled with it and filled with contents receive some shock applied thereto while they are transported or put on a display stand, or when some load is given to the resin containers in order to squeeze out the contents, then the separable part may be readily loosened from the labeled container owing to the shock or the load applied thereto. On the other hand, if the amount of the adhesive given to the separable part is too much increased in order to prevent the part from being loosened, it may cause another problem in that, even though the separable part partitioned from the label body by tearing perforations around it, the part could not be well torn along the perforations and therefore could not be satisfactorily separated from the label body.

When the separable part is used as a coupon ticket, then it may be desired that not only the surface of the separable part but also the back side thereof that is to adhere to containers is printed. However, when the back side is subjected to surface activation treatment in order that it is well compatible with printing ink and when it is printed with printing ink, then the adhesiveness between the separable part and the labeled container may be greatly lowered and therefore there occurs a problem in that the separable part is readily loosened from the surface of the labeled container.

SUMMARY OF THE INVENTION

We, the present inventors have assiduously studied for the purpose of providing an in-mold label which enables double side printing thereon and of which the other advantages are that the separable part of the label is not loosened from the surface of the labeled container during transportation and use of the labeled container, that the separable part is readily torn off from the labeled container, and that the separable part is neither damaged nor broken while it is torn off. As a result, we have found that, when the wettability index of the label surface to be printed thereon and the adhesion strength between the separable part and the resin container to be labeled are defined each to fall with a specific range, then the above-mentioned problems can be solved.

Specifically, the present invention provides an in-mold label comprising a thermoplastic resin film substrate layer and a heat-seal resin layer, which is characterized in that the wettability index of the thermoplastic resin film substrate layer surface and/or the heat-seal resin layer surface is from 34 to 73 mN/m, the label comprises a label body and a separable part, tearable perforations are provided between the label body and the separable part, and, when the label is stuck to a thermoplastic resin container during in-mold production of the container, the adhesion strength between the separable part and the container is from 80 to 270 gf/10 mm.

In the in-mold label of the invention, it is desirable that the separable part has a pick-up part and a lubricant is applied to an area of from 55 to 80% of the heat-seal resin layer surface of the separable part. Also preferably, the length of the slits to constitute the perforations is from 4 to 10 mm, and the distance between the neighboring slits is from 0.3 to 0.6 mm. Also preferably, the thermoplastic resin film substrate layer surface and/or the heat-seal resin layer surface of the in-mold label of the invention are subjected to activation treatment, coated with an antistatic layer, or printed thereon.

The invention also provides a container with the in-mold label stuck thereto.

In the in-mold label of the invention, the adhesion strength between the separable part and the container is controlled to fall within a range of from 80 to 270 gf/10 mm. The container with the label of the type stuck thereto is free from a problem of loosening of the separable part and has a good appearance even after squeezed 10 times, and the separable part can be readily torn off by hand.

BEST MODE FOR CARRYING OUT THE INVENTION

The in-mold label of the invention is described in detail hereinunder. In this description, the numerical range expressed by the wording "a number to another number" means the range that falls between the former number indicating the lowermost limit of the range and the latter number indicating the uppermost limit thereof.

<Label Structure>

The in-mold label with a separable part of the invention basically comprises a thermoplastic resin film substrate layer and a heat-seal resin layer formed on the side of the substrate layer to be stuck to a container. The substrate layer surface is printed with various informations including coupon information, and the label has a separable part that is to be torn off from the label body via the perforations formed around the part. For facilitating the tearing of the separable part, a lubricant (adhesion power-reducing agent) is applied to the heat-seal resin layer surface of the separable part, and the adhesion strength of the separable part is controlled to fall within a suitable range. Further, a pick-up part, in which the amount of the lubricant is controlled more than in the other part of the separable part, may be formed at least at one edge of the separable part.

Figure 1:
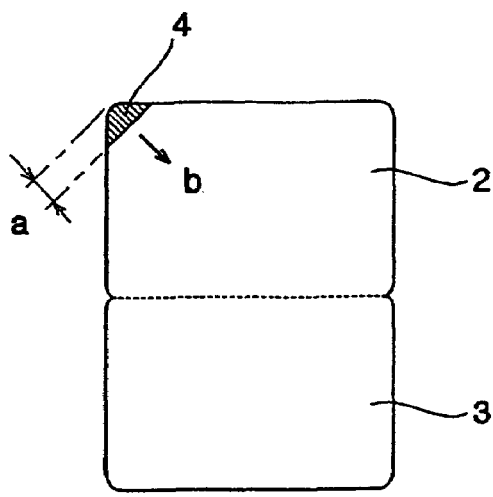
FIG. 1 shows structures of the in-mold label of the invention. In this, 1 is an in-mold label; 2 is a separable part; 3 is a label body; 4 is a pick-up part; and 5 is a container.
Figure 1:
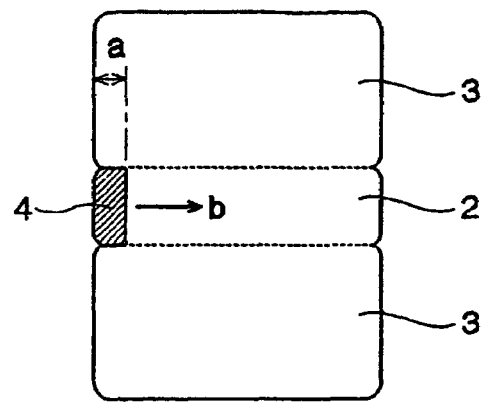
Figure 1:
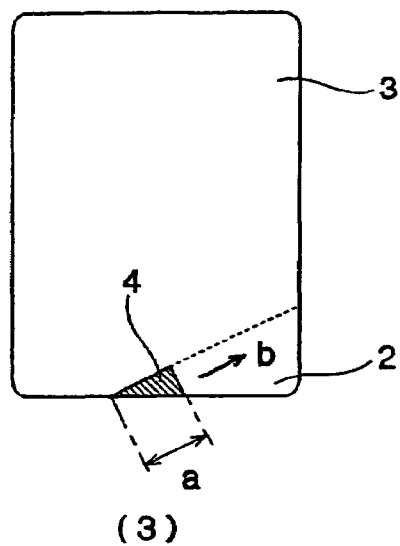
Figure 1:
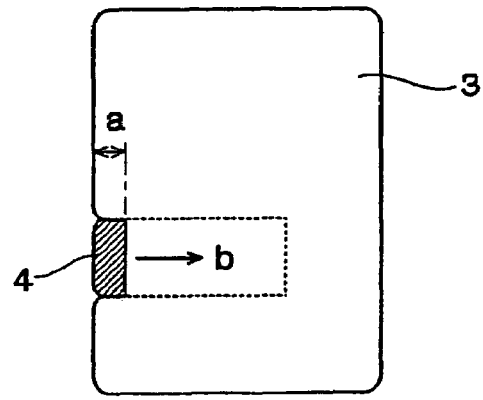

FIG. 1 shows concrete embodiments of the in-mold label of the invention. In the drawing, 2 is a separable part; 3 is a label body; 4 is a pick-up part. When the pick-up part 4 is picked up with fingers or the like and pulled in the arrowed direction b, then the separable part 4 is peeled away from the labeled container and is torn off along the perforations, whereby the separable part 4 can be completely removed from the container and the label body 3. The details of the structure of the separable part 2 and the label body 3 and the shape of the pick-up part 4 are not specifically defined, and may have various embodiments, for example, as in (1) to (4) of FIG. 1.

The material to constitute the thermoplastic resin film substrate layer may be a film of, for example, propylene-based resin; polyethylene-based resin such as high-density polyethylene, middle-density polyethylene; other polyolefin-based resin such as polymethyl-1-pentene, ethylene-cyclic olefin copolymer; polyethylene terephthalate resin; polyvinyl chloride resin; polyamide resin such as nylon-6, nylon-6,6, nylon-6,10, nylon-6,12; ABS resin; ionomer resin, or the like. One or more of these resins may be used herein either singly or as combined.

Of those, preferred are thermoplastic resins having a melting point that falls between 130 and 280° C., such as propylene-based resin, high-density polyethylene and polyethylene terephthalate resin. More preferred are those having a melting point higher by at least 15° C. than that of the thermoplastic resin to constitute the heat-seal resin layer that will be described hereinunder. Of the resins that satisfy the requirement, even more preferred is propylene-based resin in view of its chemical resistance, cost and the like. The propylene-based resin includes propylene homopolymer having isotactic or syndiotactic stereospecificity; and copolymer of propylene with an α-olefin such as ethylene, 1-butene, 1-hexene, 1-heptene, 4-methyl-1-pentene. The copolymer may be a binary, ternary or quaternary copolymer, and may also be a random copolymer or block copolymer.

An inorganic fine powder or an organic fine powder may be suitably added to the thermoplastic resin mentioned above.

The type of the inorganic fine powder and the organic fine powder is not specifically defined. Examples of the inorganic fine powder are heavy calcium carbonate, light calcium carbonate, calcined clay, talc, barium sulfate, diatomaceous earth, magnesium oxide, zinc oxide, titanium oxide, silicon oxide. Of those, preferred are heavy calcium carbonate, calcined clay and talc, as they are inexpensive and ensure good moldability.

For pore formation with it, the organic fine powder is preferably selected from resins that are incompatible with the thermoplastic resin for the substrate layer and have a higher melting point or glass transition point than the thermoplastic resin. Examples of the organic fine powder include polyethylene terephthalate, polybutylene terephthalate, polyamide, polycarbonate, polyethylene naphthalate, polystyrene, acrylate or methacrylate polymer and copolymer, melamine resin, polyethylene sulfite, polyimide, polyethyl ether ketone, polyphenylene sulfide, cyclic olefin homopolymer, and cyclic olefin-ethylene copolymer (COC). In particular, when a polyolefin-based resin is used as the above-mentioned thermoplastic resin, then the organic fine powder to be used for it is preferably selected from polyethylene terephthalate, polybutylene terephthalate, polyamide, polycarbonate, polyethylene naphthalate, polystyrene, cyclic olefin homopolymer, and cyclic olefin-ethylene copolymer (COC).

One type of the fine powder may be used alone herein, or two or more may be selected and combined for use therein. When two or more are selected, combined and used, then an inorganic fine powder and an organic fine powder may be combined.

Further if desired, any of dispersant, antioxidant, compatibilizer, UV stabilizer, an antiblocking agent and the like may be added to the resin.

The thermoplastic resin film substrate layer may be single-layered or multi-layered. When it has a multi-layered structure, then it may comprise a core layer and a surface layer and a back layer disposed on both sides of the core layer. In this, each layer may be formed of the same thermoplastic resin, or may be formed of different thermoplastic resins. When an inorganic or organic fine powder is added to the layers, then it may be the same or may differ in the layers in point of its type and the amount.

Preferably, the film to form the thermoplastic resin film substrate layer is stretched at least in one direction. When the thermoplastic resin film substrate layer has a multi-layered structure, then it is desirable that at least one layer of the structure is stretched. When multiple constitutive layers are stretched, they may be separately stretched before they are laminated, or they may be laminated and then stretched as a whole. If desired, after the stretched layers are laminated, the resulting laminate may be again stretched. Further, after a heat-seal resin layer is formed on the thermoplastic resin film substrate layer, the resulting structure may be stretched as a whole.

Various methods may be employed for stretching the film. Preferably, the film is stretched in a mode of roll-to-roll stretching that utilizes the peripheral speed difference between rolls. According to the method, the draw ratio in stretching may be controlled in any desired manner. In addition, since the resin is oriented in the machine direction of the stretched film, the label formed of the stretched film may have a higher tensile strength than that of an unstretched film and its dimensional change owing to the tension applied thereto during printing may be small. Regarding the stretching temperature, when a non-crystalline resin is used, then it is stretched at a temperature not lower than the glass transition point of the thermoplastic resin used; and when a crystalline resin is used, then it is stretched within a temperature range which falls between the glass transition point of the non-crystalline part and the melting point of the crystalline part thereof.

Preferred examples of the thermoplastic resin film substrate layer of the invention is a film produced by adding from 8 to 80% by weight of the above-mentioned inorganic or organic fine powder to the above-mentioned thermoplastic resin; a film that is stretched monoaxially or biaxially and coated on the surface with an inorganic filler-containing latex; and a film coated with aluminium in a mode of vapor deposition or lamination.

Of those, preferred for the thermoplastic resin film substrate layer is a porous stretched resin film that comprises a core layer of a biaxially-stretched film of a resin composition containing from 5 to 30% by weight of an inorganic fine power, from 3 to 20% by weight of a high-density polyethylene and from 92 to 50% by weight of a propylene-based resin, and on both sides thereof, a surface layer and a back layer of a monoaxially-stretched film of a resin composition containing from 35 to 65% by weight of an inorganic fine powder, from 0 to 10% by weight of a high-density polyethylene and from 55 to 35% by weight of a propylene-based resin. The film of the type has good printability and good thermal shrinkage resistance.

Preferably, the thickness of the thermoplastic resin film substrate layer is from 20 to 500 μm, more preferably from 30 to 200 μm. If the thickness is smaller than 20 μm, then the automatic labeler used may fail to fix the label in the regular position of the mold or the label may be wrinkled. On the other hand, if the thickness is larger than 500 μm, then the strength of the boundary part between the in-mold produced resin article and the label may lower and the drop impact strength of the resin article may lower.

Not specifically defined in point of its type, the resin to constitute the heat-seal resin layer may be any one that has the function of sticking to the resin material to constitute the container to be labeled, owing to the heat generated during the in-mold process of producing the container. Preferred examples of the resin are polyethylene-type resins having a melting point that falls between 80 and 130° C., and they include low-density or middle-density high-pressure-process polyethylene having a density of from 0.900 to 0.935 g/cm³; straight linear polyethylene having a density of from 0.880 to 0.940 g/cm³; ethylene/vinyl acetate copolymer, ethylene/acrylic acid copolymer, ethylene/alkyl acrylate copolymer, ethylene/alkyl methacrylate copolymer (in which the alkyl group has from 1 to 8 carbon atoms), and metal salt (e.g., Zn, Al, Li, K, Na) of ethylene/methacrylic acid copolymer.

Of those, more preferred are high-pressure-process polyethylene and straight linear polyethylene having the above-mentioned density and having a degree of crystallinity (according to X-ray process) of from 10 to 60% and a number-average molecular weight of from 10,000 to 40,000. In particular, from the viewpoint of the adhesiveness thereof to resin articles, straight linear polyethylene is the best, which is obtained through copolymerization of from 40 to 98% by weight of ethylene and from 60 to 2% by weight of an α-olefin having from 3 to 30 carbon atoms, in the presence of a metallocene catalyst (especially, a metallocene-alumoxane catalyst, or a catalyst comprising a metallocene compound, and a compound capable of reacting with the metallocene compound to from a stable anion, for example, as in International Laid-Open WO92/01723). One or more of these polyolefin-based resins may be used herein either singly or as combined.

The heat-seal resin layer may contain any known resin additives, not detracting from the necessary properties of the heat-seal resin layer. The additives include dye, nucleating agent, plasticizer, lubricant, antioxidant, antiblocking agent, flame retardant, UV absorbent, etc.

The heat-seal resin layer may be formed as follows: A film of heat-seal resin for it is laminated on the substrate layer to form the intended heat-seal resin layer thereon. An emulsion of heat-seal resin, or a resin solution prepared by dissolving heat-seal resin in a solvent such as toluene or ethyl cellosolve is applied onto the substrate layer and then this is dried to form thereon the intended heat-seal resin layer.

Preferably, the thickness of the heat-seal resin layer is from 1 to 100 μm, more preferably from 2 to 20 μm. The heat-seal resin layer must melt by the heat of the polyethylene melt, the propylene-based resin melt or the like that serves as a parison in forming containers, so that the label could be fused to the shaped resin containers. For this, the thickness of the heat-seal resin layer is preferably at least 1 μm. On the other hand, when the thickness of the layer is larger than 100 μm, then the label would curl to make it difficult to attain offset printing on the label, and, in addition, the label would be difficult to fix on a mold.

To ensure good printability on the thermoplastic resin film substrate layer and/or the heat-seal resin layer, the wettability index of the surface is controlled to fall between 34 and 73 mN/m, preferably between 38 and 70 mN/m. If the wettability index is smaller than 34 mN/m, then printing ink would poorly adhere to the surface and the ink would readily drop off. If, however, the index is higher than 73 mN/m, then both faces of the film would cause blocking when the film is wound up. The wettability index as referred to herein is a value determined according to JIS K-6768.

The thermoplastic resin film substrate layer surface and/or the heat-seal resin layer surface may be activated through known activation treatment such as corona discharging or flame plasma treatment, and if further desired, an antistatic layer that will be mentioned hereinunder may be formed on the surface, whereby the wettability index of the surface may be further controlled to improve the printability and the antiblocking property of the surface.

After having been subjected to the above-mentioned activation treatment, the thermoplastic resin film substrate layer surface and/or the heat-seal resin layer surface may be coated with an antistatic layer. The antistatic layer improves the paper travelability in printers, and, in particular, it prevents various troubles of double introduction of paper during offset printing and confused paper stacking in the delivering zone of printers.

In the invention, the antistatic layer may be formed by applying an aqueous solution of the following component (a) having antistatic property alone or its mixture with the following components (b) and (c) adhesive to ink onto the surface of the above-mentioned layer, followed by drying it thereon.

| Component (a): | |
|---|---|
| Tertiary or quaternary nitrogen-containing acrylic polymer | 100 parts by weight |
| Component (b): | |
| Polyimine compound | 0 to 300 parts by weight |
| Component (c): | |
| Polyaminepolyamide-epichlorohydrin adduct | 0 to 300 parts by weight |

The tertiary or quaternary nitrogen-containing acrylic polymer of the component (a) may be obtained through copolymerization of the following monomers (i), (ii) and (iii):

| Component (i): | |
|---|---|
| At least one monomer selected from compounds of general formulae (I) to (VII) mentioned below | 4 to 94% by weight |
| Component (ii): | |
| (Meth)acrylate | 6 to 80% by weight |
| Component (iii): | |
| Other hydrophobic vinyl monomer | 0 to 20% by weight |

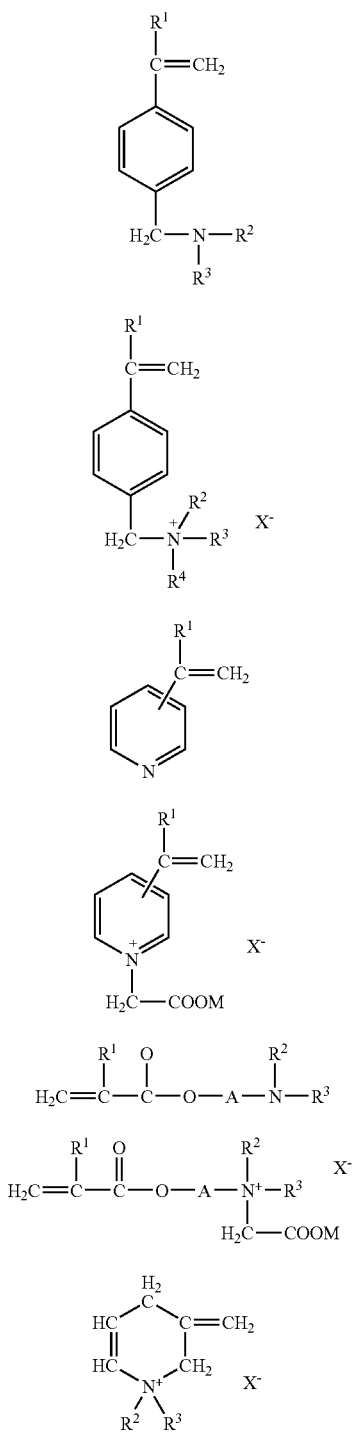

In formulae (I) to (VII), $R^1$ represents a hydrogen atom or a methyl group; $R^2$ and $R^3$ each represent a lower alkyl group (preferably having from 1 to 4, more preferably from 1 or 2 carbon atoms); $R^4$ represents a saturated or unsaturated alkyl group or a cycloalkyl group having from 1 to 22 carbon atoms; $X^-$ represents a counter anion to the quaternated $N^+$ (e.g., halide, especially chloride); M represents an alkali metal ion (e.g., sodium, potassium); A represents an alkylene group having from 2 to 6 carbon atoms. Of those monomers, preferred for the component (i) is a compound of formula (VI).

The (meth)acrylate for the component (ii) is represented by the following general formula (VIII):

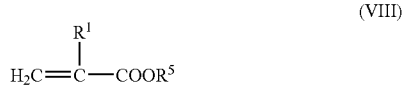

wherein $R^1$ represents a hydrogen atom or a methyl group; $R^5$ represents an alkyl group, an alkylene group or a cycloalkyl group having from 1 to 24 carbon atoms. Concretely, the compound includes butyl acrylate, capryl acrylate, and stearyl methacrylate, etc.

Examples of the other hydrophobic vinyl monomer for the component (iii) are styrene and vinyl chloride.

For the above-mentioned, tertiary nitrogen or quaternary nitrogen-containing acrylic polymer for the component (a), an especially preferred antistatic water-soluble polymer comprises a monomer of formula (VI) where $X^-$ is $Cl^-$, as a monomer of the component (i). The polymer of the type is commercially available from Mitsubishi Chemical, as trade names of Saftomer ST-1000, Saftomer ST-1100, Saftomer ST-1300 and Saftomer ST-3200.

The polyimine compound for the component (b) is a primer for enhancing the adhesion power of the layer. For example, it includes polyimine compounds which are represented by the following general formula (IX) and selected from a group consisting of polyethyleneimines having a degree of polymerization of from 200 to 3,000; polyaminepolyamide-ethyleneimine adducts; and their alkyl-modified, alkenyl-modified, benzyl-modified or aliphatic cyclohydrocarbon-modified derivatives produced by modifying them with a halide serving as a modifier, such as an alkyl halide, alkenyl halide, cycloalkyl halide, benzyl halide or the like having from 1 to 24 carbon atoms; as well as poly(ethyleneimine-urea). These are described in detail in JP-B 2-2910 and JP-A 1-141736.

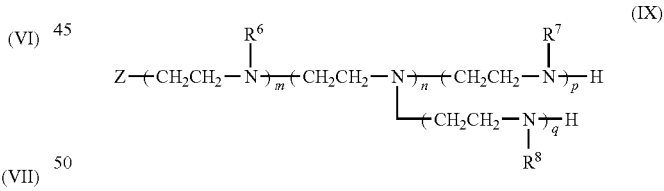

wherein Z represents a group or $-NH-R^9$, or a polyaminepolyamide residue; $R^6$ to $R^9$ each independently represent a hydrogen atom, or an alkyl, alkenyl, cycloalkyl or benzyl group having from 1 to 24 carbon atoms, but at least one of them is a group except hydrogen; m indicates from 0 to 300; and n, p and q each independently indicate a number of from 1 to 300.

The polyaminepolyamide-epichlorohydrin adduct is also a primer for enhancing the adhesion power of the layer. It includes water-soluble cationic thermosetting resins that are produced by reacting a polyamide, prepared from a saturated dibasic carboxylic acid having from 3 to 10 carbon atoms and a polyalkylene-polyamine, with epichlorohydrin. The thermosetting resins are described in detail in JP-B 35-3547. Examples of the saturated dibasic carboxylic acid having from 3 to 10 carbon atoms are dicarboxylic acids having from 4 to 8 carbon atoms, especially adipic acid.

Examples of the polyalkylene-polyamines are polyethylene-polyamines, especially ethylenediamine, diethylenetriamine, triethylenetetramine, more particularly diethylenetriamine.

In addition to these components, if necessary, the layer may further contain any other auxiliary materials, for example, water-soluble inorganic compounds such as sodium carbonate, sodium sulfate, sodium sulfite, sodium thiosulfate, barium hydroxide, sodium metasilicate, sodium pyrophosphate, sodium tripolyphosphate, sodium primary phosphate, potassium alum, ammonium alum; water-soluble organic solvents such as ethyl alcohol, isopropyl alcohol; surfactants; ethylene glycol; and water-soluble polymers such as polyvinyl alcohol.

These components (a), (b) and (c) may be used as an aqueous solution thereof generally having a total solid concentration of from 0.1 to 10% by weight, preferably from 0.1 to 5% by weight. The dry coating amount of the layer may be generally from 0.005 to 2 g/m$^2$, preferably from 0.02 to 1 g/m$^2$, in terms of the solid content thereof. For coating the composition, for example, employable are any ordinary coating methods of die coating, bar coating, roll coating, blade coating, air knife coating, size press coating or spraying. If desired, these methods may be combined. The coating layer may be dried at a temperature falling between room temperature and 100° C., and it gives an antistatic layer having a thickness of from 0.005 to 2 μm.

The blend ratio of these components (a), (b) and (c) may be as follows: When the amount of the nitrogen-containing acrylic resin (a) is 100 parts by weight, then the amount of the polyimine compound (b) is from 0 to 300 parts by weight, preferably from 0 to 200 parts by weight, and the amount of the polyaminepolyamide-epichlorohydrin adduct (c) is from 0 to 300 parts by weight, preferably from 0 to 200 parts by weight. Coated with the antistatic layer of the composition, the thermoplastic resin film substrate layer surface and/or the heat-seal resin layer surface are difficult to electrostatically charge, and the paper travelability in printers is therefore good.

The surface resistivity, as measured according to JIS K-6911, of the thermoplastic resin film substrate layer surface and/or the heat-seal resin layer surface is preferably on the order of from $10^9$ to $10^{15}$, more preferably from $10^9$ to $10^{12}$.

The thermoplastic resin film substrate layer surface and/or the heat-seal resin layer surface in the invention may be printed with various informations of, for example, product name, character, bar code, manufacturer name, dealer name, instructions for use, coupon, lottery, etc. For printing them on the surface, for example, employable are various methods of gravure printing, offset printing, letterpress printing, flexographic printing, screen printing or the like. In printing on the heat-seal resin layer, printing ink or varnish may serve as a lubricant, as will be described hereinunder. Further, the thermoplastic resin film substrate layer surface may be coated with metal such as aluminium in a mode of vapor deposition or may be hot-stamped, or may be coated with an overcoat layer in a mode of lamination or varnish application.

A pick-up part having a width of from 3 to 10 mm, preferably from 5 to 8 mm may be formed at least at one edge of the separable part (FIG. 1, a). If the width of the pick-up part is smaller than 3 mm, then the part will could not be a trigger to peel the separable part and it will be difficult to pick up with fingers; but if larger than 10 mm, then the pick-up part may curl up after the in-mold production process and the outward appearance of the container produced will be bad. Further, when a notch is formed in the boundary edge between the pick-up part and the container, then the peeling of the separable part may be easier.

The in-mold label of the invention is characterized in that the separable part is not loosened from the surface of the labeled container even when the container receives shock or load applied thereto while it is filled with contents or while it is transported or put on a display stand or used practically, and that the adhesion strength between the separable part and the resin container is specifically so controlled that the separable part can easily be peeled off from the container, concretely falling within a specific range of from 80 to 270 gf/10 mm, preferably from 100 to 250 gf/10 mm, more preferably from 120 to 240 gf/10 mm. If the adhesion strength is smaller than 80 gf/10 mm, then it may cause a problem in that the separable part may be loosened from the surface of the labeled container. On the contrary, if the adhesion strength is larger than 270 gf/10 mm, then the separable part will be difficult to peel from the labeled container.

The adhesion strength may be controlled by applying a lubricant to the surface of the heat-seal resin layer of the separable part. One preferred method of controlling the adhesion strength so as to fall within the range as above comprises applying a lubricant to from 55 to 80% of the contact area between the separable part and the container, more preferably to from 60 to 75% thereof. If the area to which the lubricant is applied oversteps the range of from 55 to 80%, then the adhesion strength between the separable part and the resin container may be difficult to control within the above-mentioned specific range. The amount of the lubricant to be applied to the pick-up part is preferably from more than 80% to 95%, more preferably from more than 80% to 90% of the area of the pick-up part.

For the lubricant, usable are various printing inks and varnishes. Examples of the inks are offset ink, UV offset ink, gravure ink, silk screen ink, flexographic ink, UV flexographic ink, etc., and any of these is usable herein. In addition, for example, silicone-containing release varnish, fluorine compound-containing release varnish, and wax may also be used herein. The method of applying the lubricant is not specifically defined. In general, the lubricant application may be attained in a mode of relief printing, offset printing, gravure printing, flexographic printing, screen printing or the like.

The degree of loosening of the separable part from the labeled container may be determined according to a test of squeezing a labeled resin container. The squeezing test in the invention is effected according to a container deformation test mentioned below, on the presumption that the labeled resin container is used in an ordinary manner.

The in-mold label printed on one side or both sides thereof is subject to die-cut to give a label having the necessary shape and size for sticking to resin containers. During or prior to the die cutting operation, it is desirable that perforations are made around the printed separable part (except the pick-up part) for facilitating the peeling of the part. The perforations may be made by the use of hot needles, electronic beams, laser beams or the like, and may be so designed that the length of the slits to constitute is from 4 to 10 mm, preferably from 5 to 8 mm, and the distance between the neighboring slits is from 0.3 to 0.6 mm, preferably from 0.3 to 0.5 mm. The length of the slit as referred to herein means the length of the through-hole to form the slit in the machine direction. If the length of the slits to constitute the perforations is too short, or if the distance between the neighboring slits is too long, then the separable part will be difficult to peel along the perforations. On the contrary, if the length of the slits to constitute the perforations is too long, or if the distance between the neighboring slits is too short, then it may cause a problem in that the separable part may be folded or broken while the label is handled.

When the perforations are formed toward the printed face side from the heat-seal resin layer side of the in-mold label, then the slit walls on the heat-seal resin layer side may be smoothed, and therefore the outer wall part of the slits of the perforations does not cut into the outer wall of the container during the in-mold process, and, as a result, the separable part can be more readily peeled off.

The in-mold label of the invention is fitted in the cavity of a mold for differential pressure molding such as vacuum molding or pressure molding or for blow molding in which a parison is pressed to the inner wall of a mold under pressure, in such a manner that the printed side of the substrate layer of the in-mold label is in contact with the wall face of the mold, and then this is fixed to the inner wall of the mold through suction of the mold. Next, the melt or the parison of a film of a container-forming resin material is led into the mold and then molded in an ordinary manner, whereby a container with the label integrally fused on the outer wall of the container is formed.

In that manner, after the label has been fixed in the mold, the label is integrated with the resin container being molded to give the intended labeled container. Accordingly, the thus-obtained labeled container is free from any unexpected label deformation, and the adhesion strength between the container body and the label is high. In addition, the labeled container has no blisters, and has a good appearance with a decorated label. When the pick-up part of the separable part of the label is picked up with fingers and when it is pulled, then the separable part can be peeled away easily along the perforations from the container.

The type of the thermoplastic resin material for the container to be labeled is not specifically defined. Preferred examples of the resin material are thermoplastic resins of the same type as that for the in-mold label, such as propylene-based resin, polyethylene (especially preferably high-density polyethylene), polyvinyl chloride, polyethylene terephthalate, polyamide. The type of the thermoplastic resin for the container may be suitably selected in accordance with the use, the object, the service environment and the service condition of the in-mold containers to be produced.

The characteristics of the invention are described more concretely with reference to the following Examples and Comparative Examples. The material, the amount, the blend ratio, the treatment, the process and the like employed in the following Examples may be varied in any desired manner not overstepping the sprit and the scope of the invention. Accordingly, the following Examples are not whatsoever intended to restrict the scope of the invention.

EXAMPLE 1

<Production of Heat-Seal Resin Material>

<Production of Ethylene/α-Olefin Copolymer>

A catalyst was prepared according to the method disclosed in JP-A 61-130314. Concretely, to 2.0 mmol of a complex, ethylene-bis(4,5,6,7-tetrahydroindenyl)zirconium dichloride, added was 1,000 molar times, relative to the complex, of methylalumoxane (by Toyo Stofer). This was diluted with toluene to make 10 liters, and a catalyst solution was thus prepared. Using this, polymerization was effected as follows: A mixture of ethylene and 1-hexene was fed into a stirring autoclave-type continuous reactor having a capacity of 1.5 liters, in such a manner that the 1-hexene content of the mixture could be 80% by weight. With the pressure inside the reactor kept at 1,600 kg/cm$^2$, this was reacted at 160° C.

After the reaction, an ethylene/α-olefin copolymer (having a 1-hexene content of 22% by weight) was obtained, having MFR of 18 g/10 min, a density of 0.898 g/cm$^3$ and a Q value of 1.9. Its peak in the TREF elution curve of the polymer is one, and the peak temperature is 50° C. H/W of the peak temperature is 1.5. The integral elution amount is 2.1% at 10° C., 3.0% at 20° C. and 100% at 80° C.

<Production of High-Pressure-Process Low-Density Polyethylene>

A high-pressure-process low-density polyethylene was produced according to an autoclave process at a reaction temperature of 260° C. and under a reaction pressure of 1,500 kg/cm$^2$. This had MFR of 4 g/10 min, a density of 0.92 g/cm$^3$, ME of 2.4 and a Q value of 10.

<Production of Substrate Layer>

A resin composition (A) comprising 67% by weight of a polypropylene homopolymer (trade name by Nippon Polychem, Novatec PP MA-8, having a melting point of 164° C.), 10% by weight of a high-density polyethylene (trade name by Nippon Polychem, Novatec HD HJ580, having a melting point of 134° C.), and 23% by weight of calcium carbonate powder having a mean particle size of 1.5 μm was melt-kneaded at 250° C. in an extruder, and extruded out through a die into a film. This was cooled to about 50° C. The film was re-heated at about 150° C., and the stretched 4-times in the machine direction by utilizing the peripheral speed difference between rolls. A monoaxially stretched film to be a core was thus obtained.

On the other hand, a resin composition (B) comprising 51.5% by weight of a propylene homopolymer (trade name by Nippon Polychem, Novatec PP MA-3), 3.5% by weight of a high-density polyethylene (trade name by Nippon Polychem, Novatec HD HJ580), 42% by weight of calcium carbonate powder having a mean particle size of 1.5 μm, and 3% by weight of titanium oxide powder having a mean particle size of 0.8 μm was melt-kneaded at 240° C. in a different extruder, and this was filmwise extruded out through a die and laminated onto the surface of the above-mentioned, monoaxially-stretched film (B/A) to obtain a laminate of surface layer/core layer.

Further, also using different extruders, a composition (C) comprising 51.5% by weight of a propylene homopolymer (trade name by Nippon Polychem, Novatec PP MA-3), 3.5% by weight of a high-density polyethylene (trade name by Nippon Polychem, Novatec HD HJ580), 42% by weight of calcium carbonate powder having a mean particle size of 1.5 μm, and 3% by weight of titanium oxide powder having a mean particle size of 0.8 μm, and a resin composition (D) comprising 75% by weight of the above-mentioned ethylene/α-olefin (1-hexene) copolymer and 25% by weight of the above-mentioned high-pressure-process low-density polyethylene for a heat-seal resin layer were separately melt-kneaded at 200° C., then fed into one coextrusion die with the two compositions laminated in the die, and filmwise co-extruded out through the die, whereby the compositions were so laminated that the heat-seal resin layer could be on the back side of the monoaxially-stretched film to be an outermost layer (B/A/C/D). Thus, a four-layered laminate of surface layer/core layer/back layer/heat-seal resin layer was obtained.

The four-layered film was led into a tenter oven, heated at 155° C., then stretched 7-fold in the cross direction by the use of the tender, then heat-set at 164° C. and thereafter cooled to 55° C., and its edges were trimmed away. Then, this was subjected to corona discharge treatment at 50 W/m²/min on both sides thereof. Next, an aqueous solution of a composition containing the following (a), (b) and (c) was applied to the surface layer side of the film, and dried to form an antistatic layer thereon.

| | |
|---|---|
| (a) Quaternary nitrogen-containing acrylic tercopolymer comprising the following units: | 0.5 wt. % |
| $$\begin{array}{c} CH_3 \\ | \\ -CH_2-C- \\ | \\ COOC_2H_4\overset{\oplus}{N}-CH_3 \\ | \\ CH_3 \end{array} \quad \begin{array}{c} CH_2COOK \\ \\ Cl^{\ominus} \end{array}$$ | 40 wt. % |
| $$\begin{array}{c} -CH_2-CH- \\ | \\ COOC_4H_9 \end{array}$$ | 35 wt. % |
| $$\begin{array}{c} -CH_2-CH- \\ | \\ COOC_{18}H_{37} \end{array}$$ | 25 wt. % |
| (b) Butyl-modified polyethylenimine | 0.3 wt. % |
| (c) Water-soluble polyamine-polyamide/epichlorohydrin adduct (Nippon PMC's trade name, WS-570) | 0.5 wt. % |
| (d) Water | balance |

The wettability index of the thermoplastic resin film substrate layer (surface layer) surface and the heat-seal resin layer surface was measured by the use of Diversified Enterprises ACCU DYNE TEST, and was 70 mN/m and 42 mN/m, respectively. The cross section of the film was observed with an electronic microscope. The thickness of the four-layered film except the antistatic layer was 100 μm (B/A/C/D=30/40/25/5 μm). The overall density of the laminated stretched resin film was 0.78 g/cm³.

Thus obtained, the five-layered laminated stretched resin film (antistatic layer/B/A/C/D) was cut with a sheet cutter into kiku-half size sheets for in-mold labels.

<Printing>

Thus obtained, the in-mold label sheets were printed on the surface side thereof, using an offset printer, Komori Corporation's Lithlon and UV offset ink, T&K TOKA's Bestcure, at a speed of 6000 sheets/hr. The UV offset four-color print on them includes product name, manufacturer name, dealer name, character, bar code and instructions for use, etc. The adhesiveness of every ink was good.

<Application of Lubricant>

Further, using the same UV offset ink, coupon information was printed on the heat-seal resin layer surface of the back side of the sheets (labels), in the area corresponding to the separable part thereof. Next, also using the same offset printer, a silicone-added release varnish (T&K TOKA's trade name, Yusei Hakuri OP Nisu) was printed on it. The area printed with these ink and varnish was 75% of the total area of the separable part. The varnish was applied to 90% of the area of the pick-up part. The adhesiveness of the ink and the varnish was good.

<Die Cutting>

Next, the thus-printed sheets for in-mold labels were perforated around the separable part except the pick-up part. Concretely, slits having a length of 6.0 mm were formed in the machine direction at intervals of 0.5 mm. Then, the sheets each corresponding to a label were subjected to die cutting to obtain labels having a length of 11 cm and a width of 9 cm. Thus, in-mold labels having a separable part were produced. The details of the structure of the in-mold label is as in FIG. 2.

<Production of Labeled Container>

Figure 2:
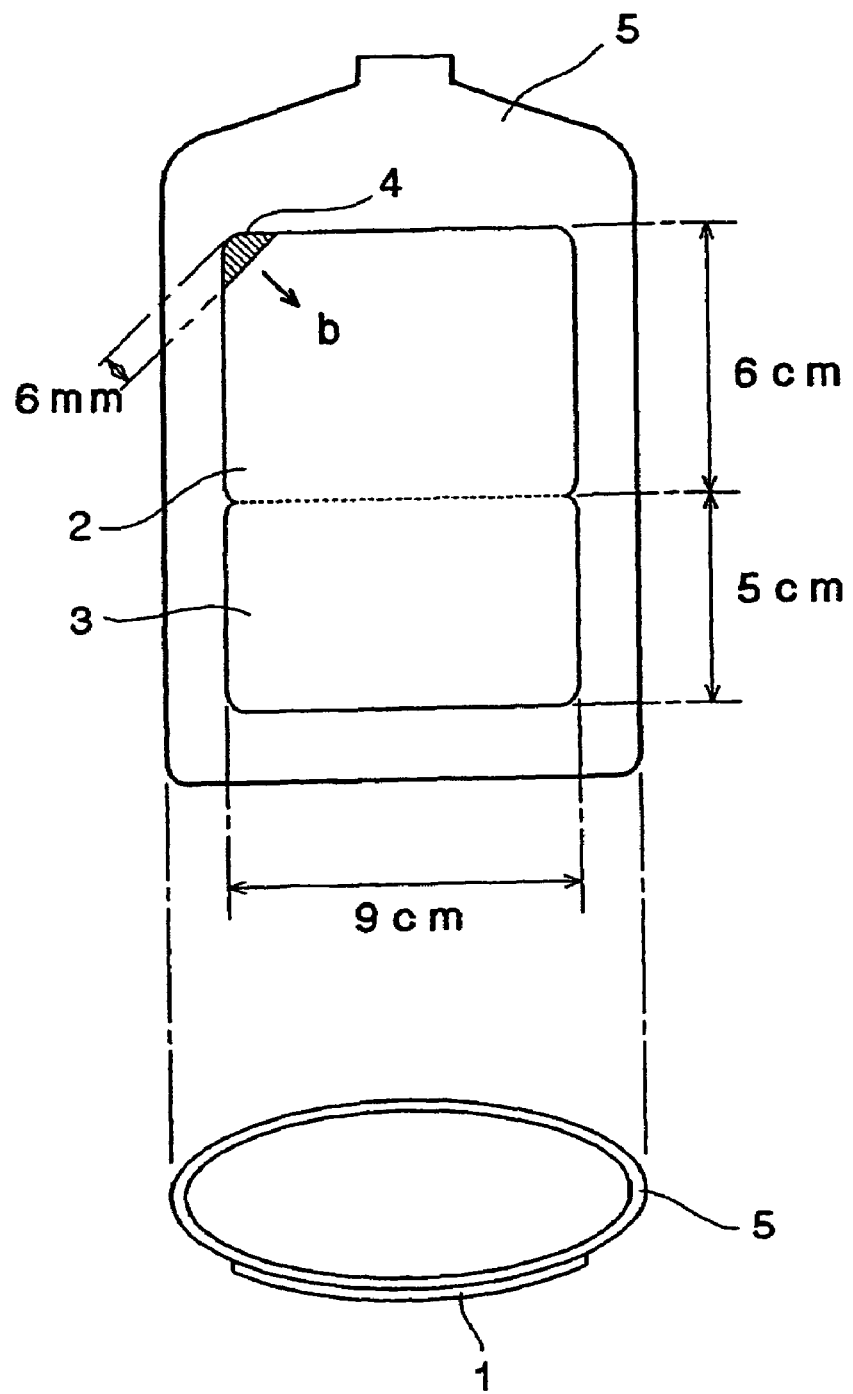
FIG. 2 is a view showing a container with the label of Example 1 stuck thereto.

The in-mold label was fixed in one half of a split mold for blow molding, in such a manner that its surface layer side could be in contact with the mold under vacuum suction, and then a high-density polyethylene (Nippon Polychem's trade name, Novatec HD HB330, having a melting point of 134° C.) was melt-extruded at 220° C. into the mold to form a parison. With that, the split mold was closed, and a pressure of 4.2 kg/cm² was applied to the parison so that the parison was inflated to be a container while thermally fused with the in-mold label in the mold. After thus molded, the mold was cooled, and then opened to obtain a blown resin container having a capacity of 1000 ml. FIG. 2 shows a front view and a cross-sectional view of the thus-obtained, labeled container.

Of the blown container, the label print did not fade and the label did neither shrink nor blister. In addition, the separable part of the label was not loosened from the container.

EXAMPLE 2

An in-mold label having a separable part and a labeled resin container were produced in the same manner as in Example 1, except that the lubricant was applied to 60% of the area of the separable part. Of the blown container, the label print did not fade and the label did neither shrink nor blister. In addition, the separable part of the label was not loosened from the container.

EXAMPLE 3

In the process of Example 1, after the aqueous solution was applied on to the surface layer of the film, an aqueous solution containing 1.0% by weight of the quaternary nitrogen-containing acrylic tercopolymer (a) alone was applied onto the back of the film, whereby the antistatic layer were formed on both surfaces of the film. The wettability index of the surface of the heat-seal resin layer on the back side of the film was 50 mN/m. The others were the same as in Example 1, and an in-mold label having a separable part and a labeled resin container were produced in the same manner as in Example 1. Of the blown container thus produced, the label print did not fade and the label did neither shrink nor blister. In addition, the separable part of the label was not loosened from the container.

COMPARATIVE EXAMPLE 1

An in-mold label having a separable part and a labeled resin container were produced in the same manner as in Example 1, except that the lubricant was applied to 90% of the area of the separable part.

COMPARATIVE EXAMPLE 2

An in-mold label having a separable part and a labeled resin container were produced in the same manner as in Example 1, except that the lubricant was applied to 50% of the area of the separable part.

COMPARATIVE EXAMPLE 3

An in-mold label having a separable part and a labeled resin container were produced according to the process of Example 1 described in JP-A 6-308886.

COMPARATIVE EXAMPLE 4

An in-mold label having a separable part and a labeled resin container were produced in the same manner as in Example 1, except that the corona discharge treatment was effected to a degree of 10 W/m²/min. The surface wettability index of the thermoplastic resin film substrate layer and the heat-seal resin layer was 66 mN/m and 32 mN/m, respectively.

COMPARATIVE EXAMPLE 5

An in-mold label having a separable part and a labeled resin container were produced in the same manner as in Example 1, except that the corona discharge treatment was not carried out. The surface wettability index of the thermoplastic resin film substrate layer and the heat-seal resin layer was 31 mN/m and 30 mN/m, respectively.

COMPARATIVE EXAMPLE 6

An in-mold label having a separable part and a labeled resin container were produced in the same manner as in Example 3, except that the corona discharge treatment was not carried out on the side of the heat-seal layer. The surface wettability index of the thermoplastic resin film substrate layer and the heat-seal resin layer was 70 mN/m and 32 mN/m, respectively.

TEST EXAMPLES

The sheets, 100 in-mold labels having a separable part, and 20 labeled resin containers which were produced in the respective Examples and Comparative Examples were tested and evaluated for their properties according to the methods mentioned below. The results are given in Table 1.

<Evaluation>

(1) Inserter Aptitude:

Using an automatic label feeder (label inserter robot, NR75W by Pentel) for label sticking to containers, 100 labels were continuously fed into a blow-molding split mold. During this, the labels were checked for the presence or absence of any trouble of label folding, label cutting or label dropping, and were evaluated according to the following criteria. The results are given in Table 1.
O: No trouble occurred.
x: Some troubles of label folding, cutting, slipping and dropping occurred.

(2) Determination of Adhesion Strength:

The label-stuck part of the labeled container was cut out with a cutter knife, and the release varnish-coated separable part thereof was cut into 10 mm-wide strips. One end of the struck part of the label was forcedly peeled from the container by 10 mm by hand. This was fixed to the air-chuck part of a tensile tester (Shimadzu Seisakusho's Autograph AGS-5KND), and the other end was also fixed thereto in the same manner. With that, the label was peeled from the container in a peeling direction of 180 degrees at a pulling rate of 300 mm/min, and the adhesion strength between the label and the container was determined. The results are given in Table 1.

(3) Squeeze Aptitude:

20 containers each labeled with an in-mold label having a separable part were prepared. With these left under the condition under which the inner pressure of the container could be freely released, the sides of the container were pressed by hand continuously 5 times or 10 times in the opposite directions so that the inner walls on both sides of the container could be close to each other. This is a squeeze test of the containers. After the pressing operation, the label was checked as to whether it peeled off or not in point of its outward appearance. The results are given in Table 1.

In Examples and Comparative Examples, the evaluation of the outward appearance of the samples was effected according to the following criteria:
O: In all the containers tested, no label loosened.
Δ: Label loosening was seen in pick-up parts of labels of some containers, but this is not problematic in practical use.
x: Significant label loosening was seen in separable parts of labels of some containers, and the containers have no commercial value.

(4) Peeling Aptitude:

20 containers each labeled with an in-mold label having a separable part were prepared. Presuming that the separable part of the label would be actually peeled off, the separable part was peeled off from the container by hand. This is a peeling test for the separable part.

In the test, the separable part was evaluated for the peelability and the tearability thereof, according to the following criteria. The results are given in Table 1.

<Peelability>
O: All readily peelable.
x: Unpeelable. (The resin film substrate layer was broken and the separable part could not be satisfactorily peeled in some containers.)

<Tearability>
O: In all the containers, the separable part was satisfactorily torn off along the perforations.
Δ: In some containers, when peeled off the separable part was broken and could not be satisfactorily torn off.
x: Impossible to tear off. (The separable part was broken, when peeled off, and could not be torn off in some containers.)

(5) Printing Aptitude:

<Determination of Antistatic Property>

Using an insulation resistor, To a Dempa Kogyo's DSM-8103, the surface resistivity of each label was measured on both sides thereof, according to JIS K-6911. This indicates the antistatic property of the label, as an index of the printability thereof.

<Paper Travelability>

Under the printing condition mentioned above, the sheets were checked for their behavior during continuous printing in a printer. Further, after dried with an UV emitter, the sheets were also checked as to whether their edges could be trued up in the delivery zone of the printer. Thus tested, the sheets were evaluated according to the following criteria:
O: The sheets are smoothly fed into a printer and travel therein, and their edges are well trued up in the deliver zone.
x: While fed, the sheets are often troubled, or their edges are not trued up in the deliver zone.

<Ink Adhesiveness>

After dried with an EV emitter, the sheets were tested for ink adhesion thereto. Concretely, an adhesive tape, Nichiban's Cellotape (trade name) was stuck to the printed sheet and peeled off, and the surface condition of the sheet was checked. Thus tested, the sheets were evaluated according to the following criteria:

O: The ink did not peel, and the substrate layer underwent material fracture in some samples.
Δ: There was some resistance in peeling the tape, but almost all the ink peeled, and this is problematic in practical use.
x: All the ink peeled, and there was no resistance in peeling the tape.

TABLE 1

| | In-Mold Label | | | | Evaluation of In-Mold Aptitude (label/bottle) | | | | |
|---|---|---|---|---|---|---|---|---|---|
| | condition of | | | | label/bottle | | | | |
| | lubricant-coated area (%) | | perforations (mm) | | adhesion | Squeeze aptitude | | peeling aptitude | |
| | | | | distance | | | | | |
| Item | pick-up part | separable part | length of slits | between slits | inserter aptitude | strength (gf/10 mm) | deformation 5 times | deformation 10 times | peelability | tearability |
| Example 1 | 90 | 75 | 6 | 0.5 | ○ | 180 | ○ | ○ | ○ | ○ |
| Example 2 | 90 | 60 | 6 | 0.5 | ○ | 240 | ○ | ○ | ○ | ○ |
| Example 3 | 90 | 75 | 6 | 0.5 | ○ | 130 | ○ | ○ | ○ | ○ |
| Comparative Example 1 | 90 | 90 | 6 | 0.5 | ○ | 50 | Δ | X | ○ | ○ |
| Comparative Example 2 | 90 | 50 | 6 | 0.5 | ○ | 350 | ○ | ○ | Δ | X |
| Comparative Example 3 | — | — | 0.7 | 0.7 | ○ | 100 | ○ | Δ | ○ | Δ |
| Comparative Example 4 | 90 | 75 | 6 | 0.5 | ○ | 190 | ○ | ○ | ○ | ○ |
| Comparative Example 5 | 90 | 75 | 6 | 0.5 | ○ | 210 | ○ | ○ | ○ | ○ |
| Comparative Example 6 | 90 | 75 | 6 | 0.5 | ○ | 110 | ○ | Δ | ○ | ○ |

| | Sheet Printability Evaluation | | | | | |
|---|---|---|---|---|---|---|
| | wettability index (mN/m) | | ink ad- | surface resistivity (Ω/square) | | |
| Item | substrate layer surface | heat-seal surface | hesiveness heat-seal surface | substrate layer surface | heat-seal surface | paper travelability |
| Example 1 | 70 | 42 | ○ | $2 \times 10^{11}$ | $1 \times 10^{15}$ | ○ |
| Example 2 | 70 | 42 | ○ | $2 \times 10^{11}$ | $1 \times 10^{15}$ | ○ |
| Example 3 | 70 | 50 | ○ | $2 \times 10^{11}$ | $8 \times 10^{10}$ | ○ |
| Comparative Example 1 | 70 | 42 | ○ | $2 \times 10^{11}$ | $1 \times 10^{15}$ | ○ |
| Comparative Example 2 | 70 | 42 | ○ | $2 \times 10^{11}$ | $1 \times 10^{15}$ | ○ |
| Comparative Example 3 | 43 | 31 | X | $1 \times 10^{15}$ | $1 \times 10^{15}$ | X |
| Comparative Example 4 | 66 | 32 | Δ | $7 \times 10^{11}$ | $1 \times 10^{15}$ | ○ |
| Comparative Example 5 | 31 | 30 | X | $1 \times 10^{15}$ | $1 \times 10^{15}$ | X |
| Comparative Example 6 | 70 | 32 | X | $2 \times 10^{11}$ | $5 \times 10^{12}$ | ○ |

The present disclosure relates to the subject matter contained in PCT/JP03/14902 filed on Nov. 21, 2003, Japanese Patent Application No. 339325/2002 filed on Nov. 22, 2002 and Japanese Patent Application No. 36083/2003 filed on Feb. 14, 2003, which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. An in-mold label comprising:
    a thermoplastic resin film substrate layer; and
    a heat-seal resin layer,
    wherein the label comprises a label body and a separable part, tearable perforations are provided between the label body and the separable part, the adhesion strength between the separable part and a thermoplastic resin container is from 80 to 270 gf/10 mm when the label is stuck to the container during in-mold production of the container, a lubricant is applied to from 55 to 80% of the surface area of the heat-seal resin layer of the separable part, and the wettability index of both the thermoplastic resin film substrate layer surface and the heat-seal resin layer surface is from 34 to 73 mN/m.

2. The in-mold label as claimed in claim 1, wherein the wettability index of the thermoplastic resin film substrate layer surface and/or the heat-seal resin layer surface is from 38 to 70 mN/m.

3. The in-mold label as claimed in claim 1, wherein the thermoplastic resin film substrate layer comprises a core layer of a biaxially-stretched film of a resin composition containing from 5 to 30% by weight of an inorganic fine power and/or an organic fine powder, from 3 to 20% by weight of a high-density polyethylene and from 92 to 50% by weight of a propylene-based resin, and on both sides of the core layer, a surface layer and a back layer of a monoaxially-stretched film of a resin composition containing from 35 to 65% by weight of an inorganic fine powder, from 0 to 10% by weight of a high-density polyethylene and from 55 to 35% by weight of a propylene-based resin.

4. The in-mold label as claimed in claim 1, wherein the heat-seal resin layer contains a high-pressure-process polyethylene having a density of from 0.900 to 0.935 g/cm$^3$, a degree of crystallinity (according to X-ray process) of from 10 to 60%, and a number-average molecular weight of from 10,000 to 40,000, and/or a straight linear polyethylene having a density of from 0.880 to 0.940 g/cm$^3$.

5. The in-mold label as claimed in claim 1, wherein the thickness of the thermoplastic resin film substrate layer is from 20 to 500 μm, and the thickness of the heat-seal resin layer is from 1 to 100 μm.

6. The in-mold label as claimed in claim 1, wherein the thermoplastic resin film substrate layer surface and/or the heat-seal resin layer surface are subjected to activation treatment.

7. The in-mold label as claimed in claim 6, wherein the thermoplastic resin film substrate layer surface and/or the heat-seal resin layer surface are subjected to corona discharge treatment.

8. The in-mold label as claimed in claim 6, wherein the thermoplastic resin film substrate layer surface and/or the heat-seal resin layer surface are subjected to activation treatment, and an antistatic layer is formed on the activation-treated surface.

9. The in-mold label as claimed in claim 8, wherein the antistatic layer contains a tertiary or quaternary nitrogen-containing acrylic polymer.

10. The in-mold label as claimed in claim 9, wherein the antistatic layer contains a polyimine compound and/or a polyamine-polyamide/epichlorohydrin adduct.

11. The in-mold label having a separable part as claimed in claim 1, wherein the thermoplastic resin film substrate layer surface and/or the heat-seal resin layer surface are printed.

12. The in-mold label as claimed in claim 1, wherein the perforations comprise slits, the length of the slits to constitute the perforations is from 4 to 10 mm, and the distance between the neighboring slits is from 0.3 to 0.6 mm.

13. The in-mold label as claimed in claim 1, wherein the perforations comprise slits, the length of the slits to constitute the perforations is from 5 to 8 mm, and the distance between the neighboring slits is from 0.3 to 0.5 mm.

14. The in-mold label as claimed in claim 1, wherein the adhesion strength between the separable part and the container is from 120 to 240 gf/10 mm.

15. The in-mold label as claimed in claim 1, wherein the separable part has a pick-up part.

16. The in-mold label as claimed in claim 15, wherein a lubricant is applied to from more than 80% to 95% of the surface area of the pick-up part.

17. The in-mold label as claimed in claim 15, wherein the width of the pick-up part is from 3 to 10 mm.

18. A container labeled with the in-mold label of claim 1.

\* \* \* \* \*